United States Patent [19]

Nomizu

[11] Patent Number: 5,321,521
[45] Date of Patent: Jun. 14, 1994

[54] IMAGE DATA COMPRESSION TRANSMISSION METHOD UTILIZING A SYNCHRONIZATION CODE

[75] Inventor: Yasuyuki Nomizu, Ebina, Japan

[73] Assignee: Ricoh Company, Ltd., Tokyo, Japan

[21] Appl. No.: 913,708

[22] Filed: Jul. 16, 1992

[30] Foreign Application Priority Data

Jul. 19, 1991 [JP] Japan .................... 3-203574

[51] Int. Cl.⁵ ............... H04N 1/419; H04N 1/411; G06K 9/36
[52] U.S. Cl. ............................ 358/426; 358/405; 358/409; 358/261.1; 358/262.1; 382/56; 375/113; 375/116; 358/435
[58] Field of Search ............... 358/405, 406, 407, 409, 358/410, 411, 426, 427, 435, 436, 438, 261.1, 261.2, 261.3, 261.4, 262.1; 382/56; 375/113, 114, 116

[56] References Cited

U.S. PATENT DOCUMENTS 3,546,592 12/1970 Mayo .
4,275,466 6/1981 Yamamoto ..................... 375/113
4,694,473 9/1987 Etoh .............................. 375/116
4,837,634 6/1989 Hisada .......................... 358/409
5,057,937 10/1991 Muramatsu et al. ............ 358/405

Primary Examiner—Edward L. Coles, Sr.
Assistant Examiner—Kimberly A. Williams
Attorney, Agent, or Firm—Oblon, Spivak, McClelland, Maier & Neustadt

[57] ABSTRACT

An image data compression transmission method performs coding of image data into coded data line by line, by a predetermined coding process, adding a synchronizing code to the coded data and generating coded information data by means of a coder. A decoder extracts the synchronizing code from the coded information data, and initializes a decoding process at the receiving side. The decoder determines the validity of the coded information data received from the coder based on the synchronizing code extracted therefrom.

If the information data is invalid, then, the decoder performs error processing.

10 Claims, 7 Drawing Sheets

IMAGE DATA COMPRESSION TRANSMISSION METHOD UTILIZING A SYNCHRONIZATION CODE

BACKGROUND OF THE INVENTION

The present invention relates to an image data compression transmission method which uses arithmetic code used in image transmission in facsimile apparatuses and the like, compress and transfer of image data, and more particularly uses decoding error control process when errors occur in data transmission.

Arithmetic coding is one method for the coding of image signals. Arithmetic coding achieves a high coding efficiency without enlarging the information source which generates the information strings to be coded. Arithmetic coding has been described in Japanese Patent Laid-open 222576-1989.

The above arithmetic coding method, called QM-coder, is the standard CCITT recommendation until march 1993. The QM-coder performs of the image data coding process while it estimates a non-priority symbol appearance probability (in general, black picture element in the monotone image) dynamically. It is necessary to determine real non-priority symbols so as to obtain coding efficiency. However, the real non-priority symbol appearance probability is obtained for calculations after all of the picture elements for coding are discovered. Accordingly, when using the scanning method in the facsimile apparatus it is impossible to calculate the real non-priority symbol appearance probability, because the coding processing is coded by mean of scanning image data. Accordingly, the QM-coder sets an initial value of the symbol appearance probability, and estimates non-priority symbol appearance probability dynamically.

The following is a description of the procedures in an image data compression and transmission method using the arithmetic coding (QM-coder).

① P is set as a non-priority symbol appearance probability of signals that are picture element strings generated from an information source, predetermined parameter A is used, and parameters $A_0$ and $A_1$, set beforehand, are used. The parameters $A_0$, $A_1$, which satisfy the following equation, are then determined.

$$A_1 = A \times P, \quad A_0 = A - A_1$$

② The codes of picture elements are determined by using parameters $A_0$ and $A_1$ described above, and the code C with respect to the picture element string, according to the value of picture element x of an information string that is the object of coding. In addition, one of the parameters $A_0$ and $A_1$ is then coded in order by the coder as a new parameter.

③ The coded data is transmitted to the receiving side, and the decoder in the receive side decodes the input coded data into image signals.

The QM-coder characteristic differs from the MH, MR, and MMR methods, in that it does not utilize a page-end code. Accordingly, when the receive side reproduces image data, it is necessary for the transmission to have transmitted all line information of the image data to the receive side. Furthermore, the QM-coder often does not output the code while one line is being coded. Because, when non-priority symbol appearance probability is high, image data code is not generated.

When an image data compression and transmission method using the arithmetic coding is used to perform data transmission, it is a necessary condition that there be no qualitative errors in the code on the transmission line. This condition is the same as a condition in the CCITT recommendations for the T.6 (MMR) method.

For example, if a data transmission error on the transmission line occurs when arithmetic coding is being used to transmit data to the receiving side, a decoder of the receiving side will encounter difficulties in performing decoding of data after that data has been received. As a result, the decoder will not be able to correct errors and decoding will not be possible. Therefore, image data compressed using arithmetic coding will be reproducible only when there are no errors on the transmission line but will not be reproducible when errors are generated on the transfer path. Thus, errors generated on a transfer path limit the compression and transfer of data when using arithmetic coding.

SUMMARY OF THE INVENTION

Accordingly, a general object of the present invention is to provide a novel and effective image data compression and transmission method which eliminates the problems described above and which are associated with the conventional art.

A more specific object of the present invention is to provide an image data compression and transmission method which enables compression and reproduction of images using arithmetic coding even when errors have been generated on the transmission line, and for which method there is no loss in efficiency of compression.

The above objectives can be attained by an image data compression transmission method for transmitting image data from a transmission side to a receiving side, with data compression, the method comprising the steps of:

coding line by line image data to be transmitted, the coding being performed according to a predetermined coding process for producing coded data;

adding a synchronizing code to the coded data every predetermined number of the data lines, so as to produce coded information data that contains the coded data and the synchronizing code;

transmitting the coded information data from the transmission side to the receiving side;

extracting the synchronizing code from the coded information data received at the receive side;

initializing an initial value of an predetermined decoding process in synchronization with the synchronizing code that has been extracted from the coded information data that in turn has been received at the receiving side;

determining the validity of the coded information data received at the receiving side based on the synchronizing code extracted therefrom; and when it is determined in the determining step above that the coded information data is valid, a synchronized line by line decoding of the coded data contained in the coded information data takes place so as to reproduce the image data by means of the predetermined decoding process, synchronization between the coder and the decoder being achieved by means of the synchronizing code; and when it is determined in the determined step that the coded information data is invalid, a predetermined error correction process begins, for correcting the decoding error contained in the coded information data.

DESCRIPTION OF THE PREFERRED EMBODIMENTS

A detailed description of the preferred embodiments of the present invention is given below, with reference to the appended drawings.

Figure 1:
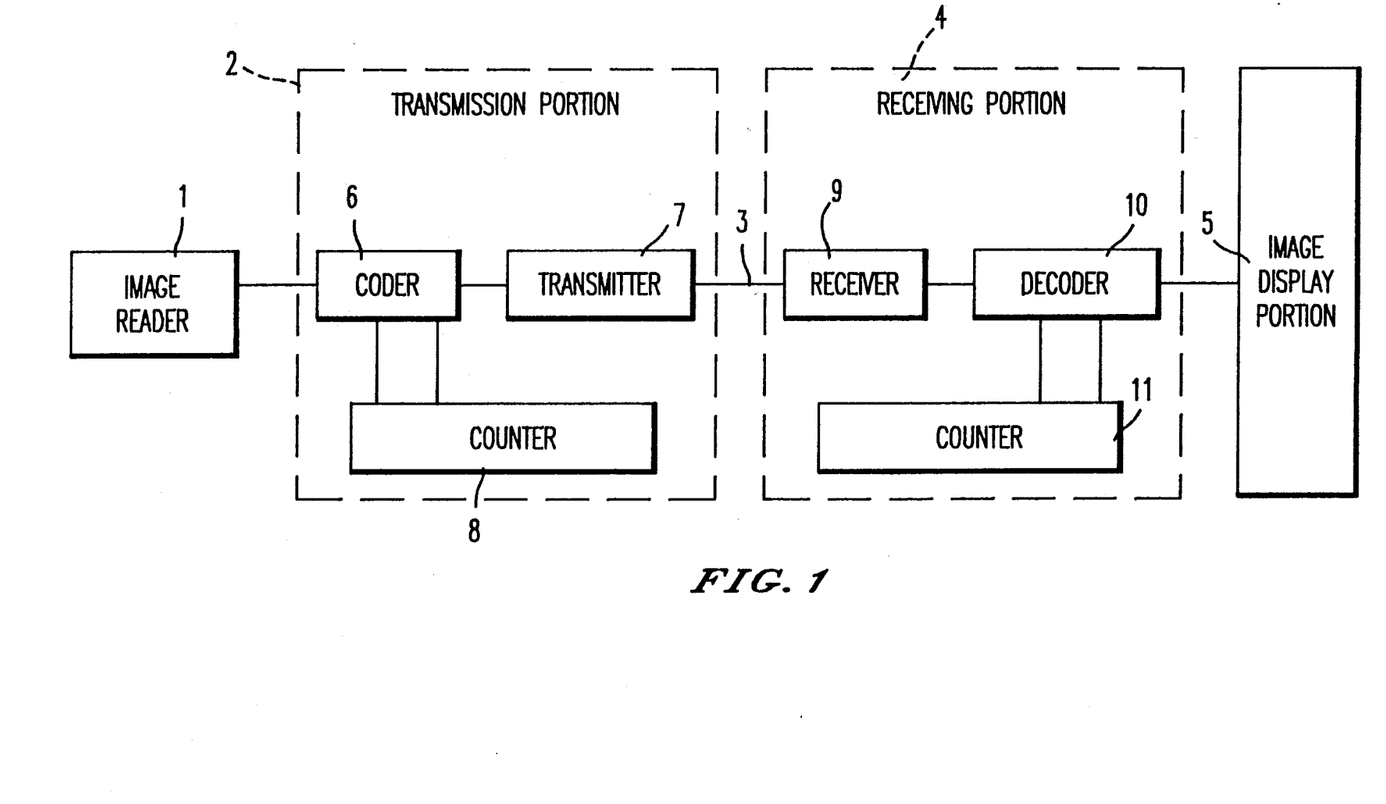
FIG. 1 is block diagram showing the system of an embodiment according to the present invention.

FIG. 1 is a block diagram of a system of an image transfer apparatus. In FIG. 1, the image transfer apparatus comprises from an image reader 1, a transmission portion 2, a receiving portion 4 and an image display and recording portion 5. These portions are connected to each other by a transmission line 3.

The transmission portion 2 has a coder 6 which uses the arithmetic coding method (QM-coder) to code the image data when image data read by the image reader 1 is input, a transmitter 7 that transmits the data coded by the coder 6, to the receiving portion 4, and a counter 8 that counts a number of lines of the coded data.

The receiving portion 4 has a receiver 9 which receives the coded data transmitted from the transmitter 7 of the transmission portion 2, a decoder 10 that decodes the received coded data, and a counter 11 in which is set the number of lines of the coded data. The number of lines of the coded data can indicate the number of lines which are between neighboring synchronizing codes. The number of lines in the counter is determined by the coder 6 or the decoder 10 every time the coding process or the decoding process for one line takes place.

The coder 6 codes the image data input from the image reader 1. Then, the coder 6 generates the coded data, which comprises arithmetic code and a the beginning and at the end of the arithmetic code, synchronizing code.

Figure 2:
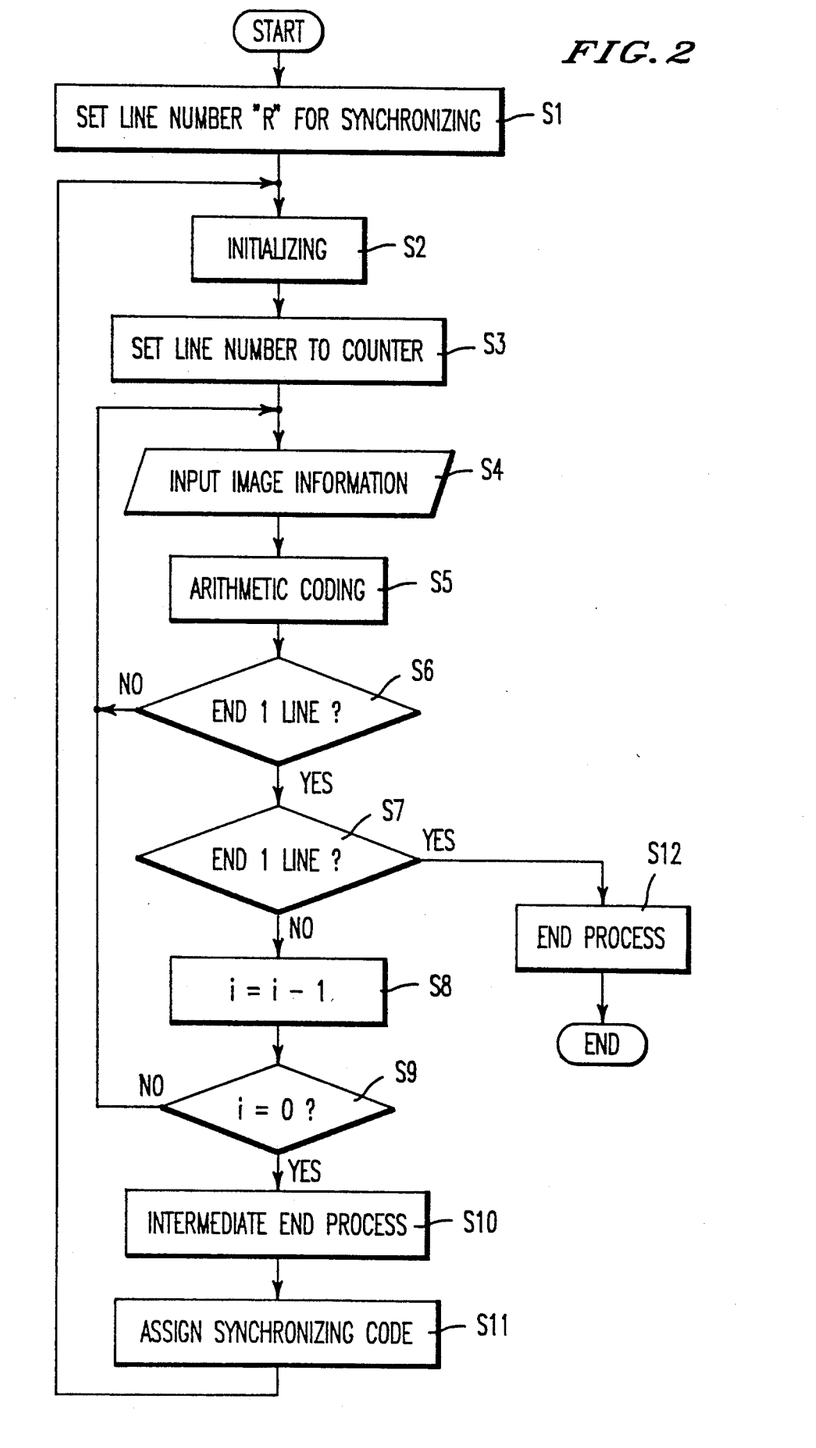
FIG. 2 is a flowchart showing the operation of a coder according to an embodiment of the present invention.

The following is a description of the operation for the case when the digital image signals received from the image reader 1 in the image transmission portion 2 having the constitution described above, are coded by the coder 6.

STEP 1: The number of lines R for achieving synchronization between the process of the coder 6 and the process of the decoder 10 is determined. The coding process resumes at each predetermined synchronizing timing after a predetermined number of lines.

STEP 2: The coder 6 is initialized. This step sets the initial value of the non-priority symbol appearance probability for utilizing the QM-coder in the arithmetic coding process.

STEP 3: The value i of the counter 8 which counts the number of lines is set for the predetermined number of lines R.

STEP 4: The image reader 1 inputs the image data to the coder 6.

Figure 3:
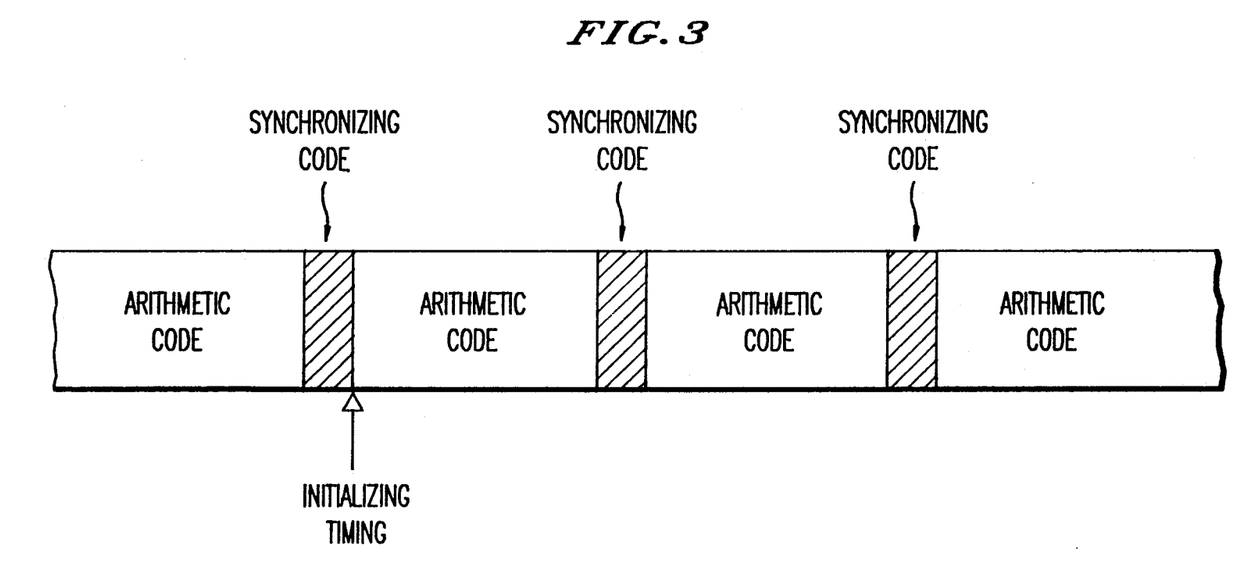
FIG. 3 is a view showing the constitution of a first coded data according to an embodiment of the present invention.

STEP 5: The coder 6 performs the arithmetic coding processing when the image data is input from the image reader 1. Moreover, the data coded in the arithmetic coding processing performed is generated in bytes. In FIG. 3, the arithmetic codes are a predetermined number of bytes.

STEP 6: In the arithmetic coding processing of STEP 5, the coder 6 judges whether or not the coding of image data of one line has finished, and if it has not the process returns to STEP 4.

STEP 7: When the coding of the image data for one line has finished, the coder 6 judges whether or not the image data processing has finished, and if it has the process is skip to step 12.

STEP 8: If the image data processing has not finished the counter 8 decrements the value i by 1. The valve i is initially set to the number of lines R for performing the synchronizing process of the decoder 10.

STEP 9: Image data from the image reader is successively inputted the coder 6, which coder 6 performs arithmetic coding processing until the value i of the counter 8 reaches zero.

STEP 10: The coder 6 repeatably performs an intermediate end process (to be described later) until the value i of the counter 8 becomes zero (i=0).

STEP 11: As shown in FIG. 3, the coder 6 appends a synchronizing code before and after the arithmetic code data, then the process of the coder 6 goes to STEP 2. The synchronizing code quantity of the synchronizing code enables changing of the number of lines in the code according to the output data format of the arithmetic coding method.

STEP 12: When it is confirmed that all the image data input in step 7 from the image reader 1 has been coded, the end code is appended to the coded information data, and the coding processing ends.

The intermediate end processing mentioned above consists of FLUSH processing performed by the coder 6 in the QM-coder. The FLUSH processing ends the code strings when the coding thereof ends. The FLUSH processing clears all contents of a code register of the coder 6, and transmits the contents of the code register to the transmitter 7.

In this manner, the coded data that has been arithmetic coding processed is received from the transmitter 7 of the transmission portion 2, via the transmission line 3, and is decoded by the decoder 10 of the receiving portion 4. The decoding processing of the decoder 10 is basically performed using process is the opposite of the coding processing, and which differs therefrom only in that it also includes error processing.

Figure 4:
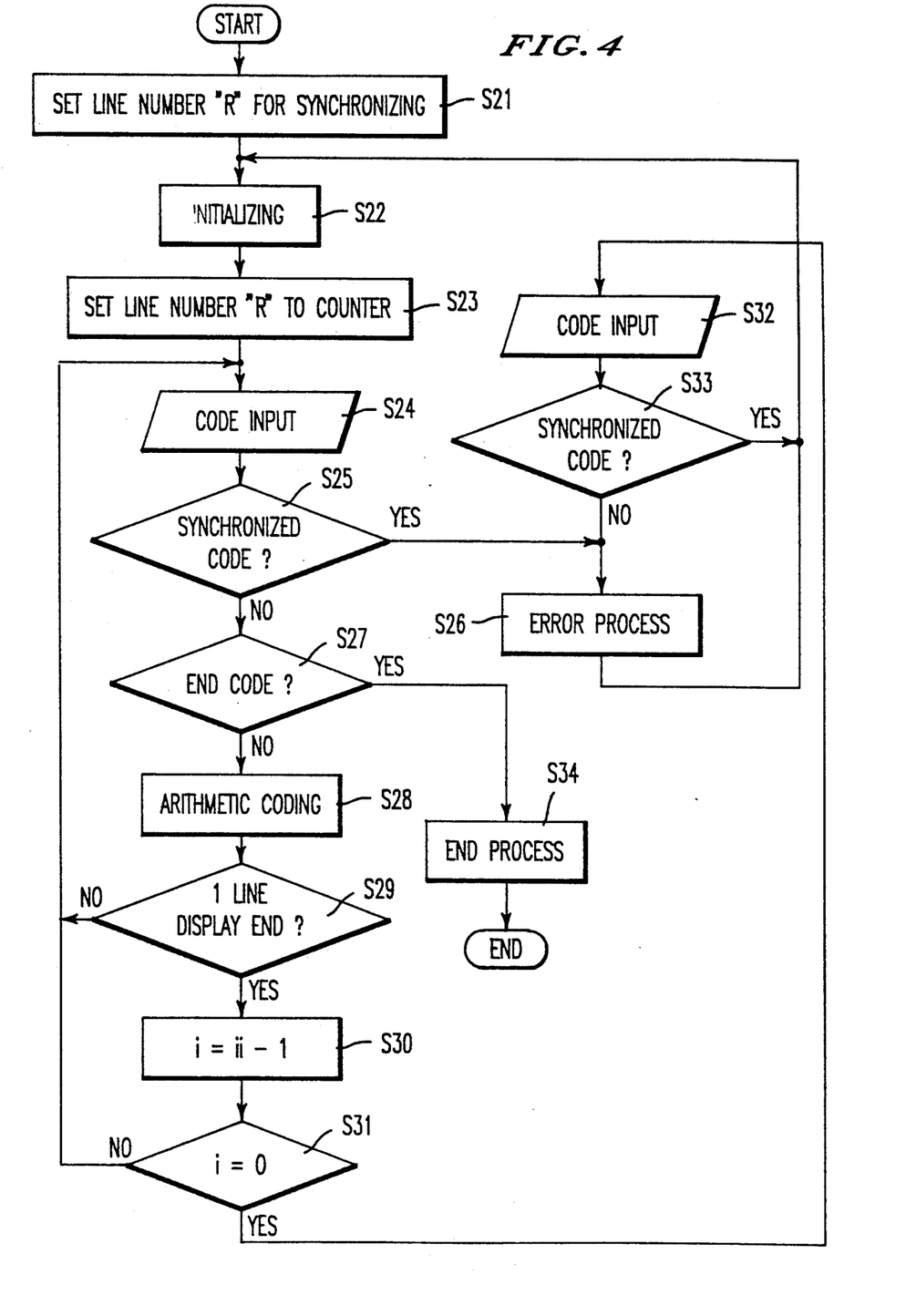
FIG. 4 is a flowchart showing the operation of a decoder according to an embodiment of the present invention.

The following is a description with reference to the flowchart of FIG. 4 of the operation when the coded data is decoded by the decoder 10.

STEP 21: The decoder 10 determines the number of lines R, so as to be synchronized with the output process of the coder 6.

STEP 22: The decoder 10 is initialized. This step sets the initial value of the non-priority symbol appearance probability for the arithmetic decoding process.

STEP 23: The value i of the counter 8 which counts the number of lines is set for the predetermined number of lines R.

STEP 24: The decoder 10 is input the coded information data from the receiver 9 in the receiving portion 4.

STEP 25: The decoder 10 judges whether or not the input coded information data is coded data or whether it is synchronizing code. I±the coded information data is synchronizing code, the process proceeds to perform to error processing (STEP 26).

STEP 26: If the coded information data input from receiver 9 is a synchronizing code, then it is judged that there occurred a transfer error, and error processing is performed; the process returns to STEP 22.

STEP 27: If the input coded information data is an end code, the process skips to STEP 34, and the decoding process ends.

STEP 28: If the input coded information data is coded data, then arithmetic decoding processing is performed until the decoding of a predetermined line portion of image data has finished. Here in the decoding processing, input to the arithmetic decoding processing is in byte units, in the same manner as the coded data was output from the coder.

STEP 29: If decoding of a one line portion has finished and an image data is reproduced, then the decoding process proceeds to STEP 30; if the decoding processing of a one line portion has not finished, the process returns to STEP 24.

STEP 30: When decoding of a one line portion has finished, the value i of the counter that counts the number of lines is decremented (i=i−1).

STEP 31: The decoder 10 repeatedly performs the decoding processing of the coded data received from the receiver 9, until the value i of the counter 11 becomes 0 (i=0).

STEP 32: When the value i of the counter 11 has become 0, the decoder 10 continues to receive 11 has become 0, the the coded data from the receiver 9.

STEP 33: The decoder 10 checks whether or not the data input from the receiver 9 is synchronizing data. If the input coded information data is not synchronizing code, the error processing of STEP 26 is performed as if there had occurred a transmission error, and the initialization of the decoder 10 in STEP 22 is performed. If the coded information data input from receiver 9 is synchronizing code, there is a status where there are no transmission errors, and initialization of the decoder 10 of STEP 22 is performed immediately.

STEP 34: In STEP 27, when all of the coded data of the coded information has been decoded, and an end code is input to the decoder 10, and the decoder 10 detects the end code, then, the decoding processing ends.

FIG. 3 illustrates the timings for setting the initializing status of the process of the decoder 10 with every synchronizing code. In this invention, if a transmission error has occurred, the decoder 10 resumes the processing of the next line of data.

As described above, synchronization between the process of the coder 6 in the transmission portion 2 and the process of the decoder 10 in the receiving portion 4 is achieved every predetermined number of lines, and the initializing of the process of the decoder 10 enables obtainment of a reproduced image having minimized error of image data without a drop in the compression ratio.

The following is a description of the decoder error process of STEP 26.

The decoder error process checks the coded data input from the coder 6. A no-error status means that the synchronizing code occurs after the end of the process for the predetermined number of data lines. An error status means that the synchronizing code does not occur after the end of the process for the predetermined number of the line.

In other words, if the coded information data input from the coder 6 is without synchronizing code after the decoding process for the predetermined number of lines, then the decoder 10 determines a transmission error status.

When the number of lines of data in the coded information data is less than the predetermined number of lines, the error process performs a process to complement data. On the other hand, when the number of lines of the coded data is more than the predetermined number of the lines, the error process performs a procedure to excessive data.

Furthermore, when the decoder 10 has reproduced error data of the number of the line, the coder 6 specifies the appropriate number of lines to the decoder 10. The decoder 10 enables reproduction of the coded data of the number of lines specified by the coder 6. The decoder 10 performs the initializing process after the end of the error process. Accordingly, the decoder 10 generally enables the decoding process to proceed continuously.

Figure 5:
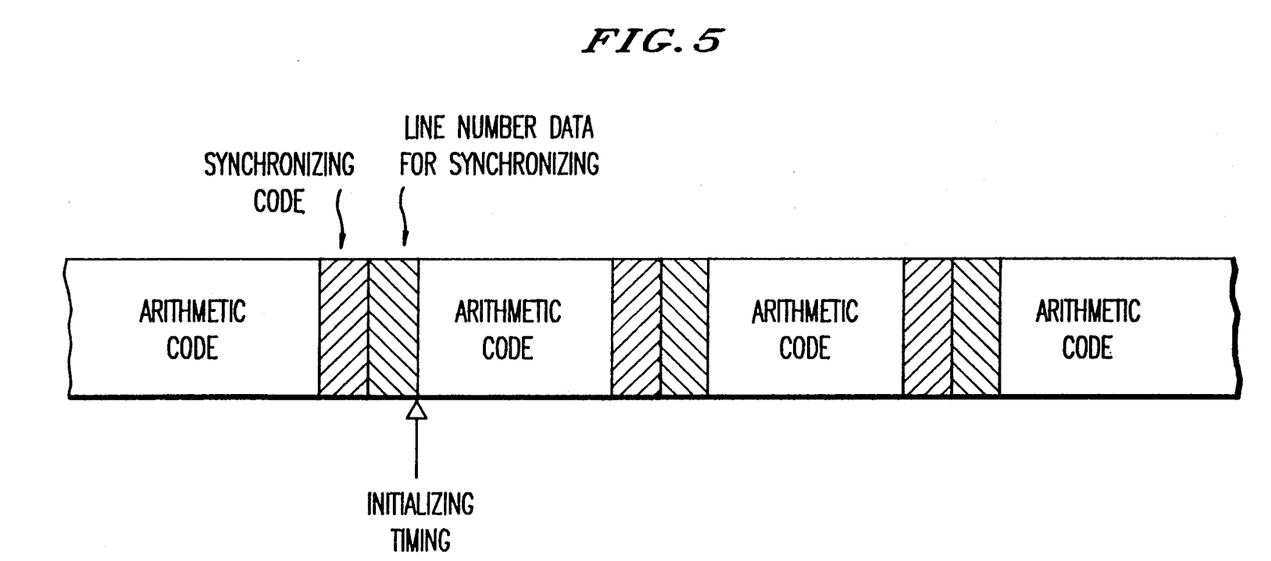
FIG. 5 is a view showing the constitution of a second coded data according to an embodiment of the present invention.

Moreover, in the embodiment described above, the number of lines for the synchronizing procedure is determined beforehand by protocol, and is fixed while the processing is being performed. However, as shown in FIG. 5, when data concerning the number of lines is inserted after the synchronizing code, it is possible to arbitrarily change the number of lines in order to maintain synchronization even while processing is being performed.

Figure 6:
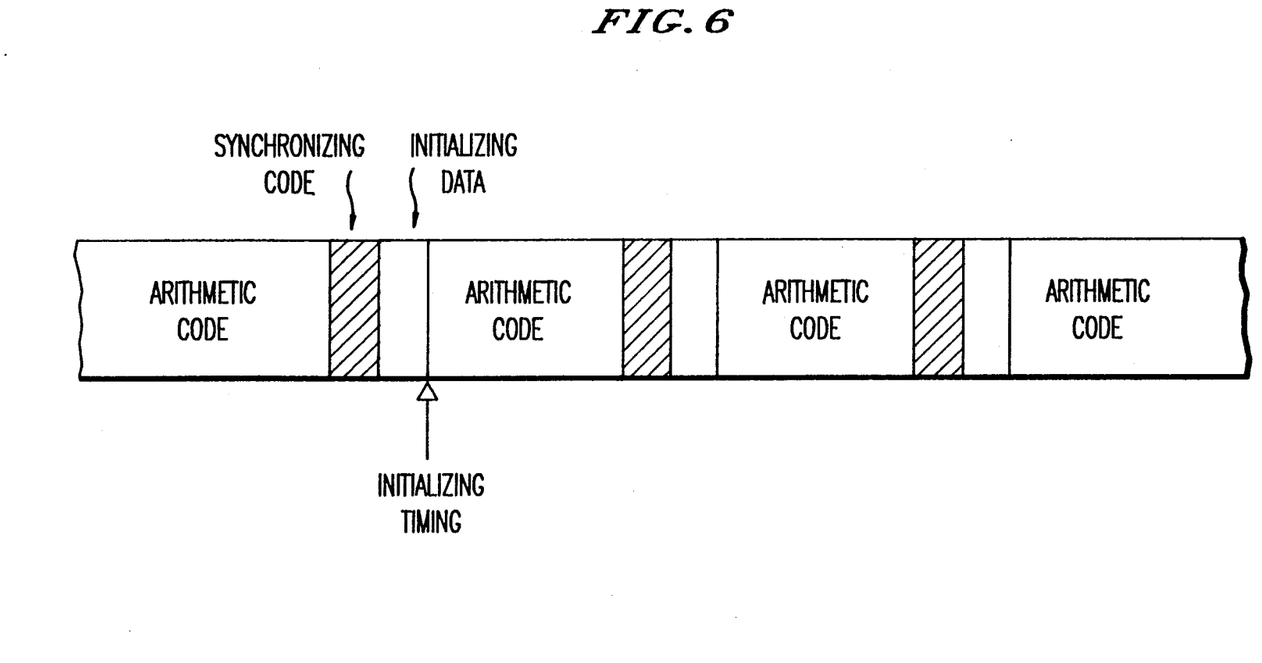
FIG. 6 is a view showing the constitution of a third coded data according to an embodiment of the present invention.

In addition, as shown in FIG. 6, when data indicating the initialization status is inserted into the coded information data after the synchronizing code, it is possible to determine the status when there is initialization of the decoder 10. Accordingly, there is even less deterioration in the data compression ratio.

Figure 7:
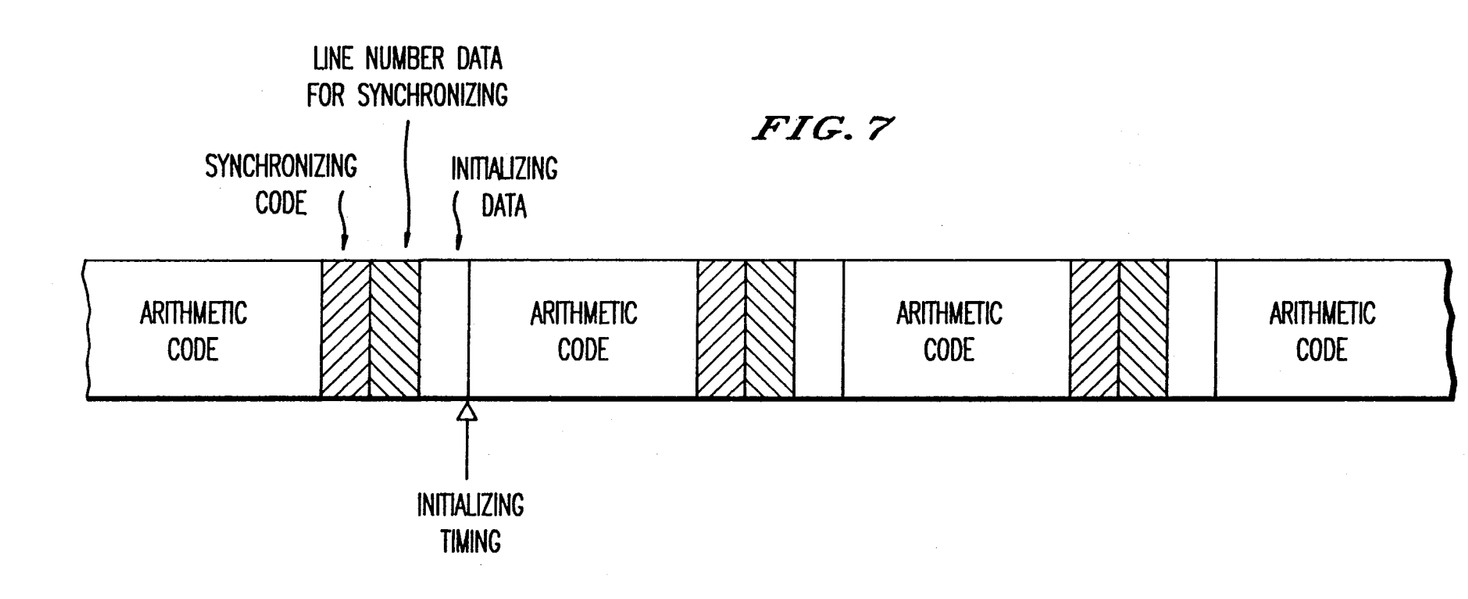
FIG. 7 is a view showing the constitution of a fourth coded data according to an embodiment of the present invention.

Furthermore, as shown in FIG. 7, when data indicating the status of initialization, and data concerning the number of lines are inserted into the coded information data after the synchronizing code, it is possible to arbitrarily change the number of lines in order to maintain synchronization even during processing, and for the deterioration of the data compression ratio to be reduced.

Transmissions such as of facsimile apparatuses have a FIFO memory, which memory prevents a drop of the processing speed due to the difference between the transmission speed and the data generation speed. If there is no such difference during transmission of data on the transmission line 3, the coded data generated by the coder 6 is transmitted to the receiver 9 immediately. If there is such a difference during transmittion of data on the transmission line 3, the coded data is stored in the FIFO memory. After transmitting, the stored data is transmitted to the receiver 9.

Further, the present invention is not limited to these embodiments and various variations and modifications may be made without departing from the scope of the present invention.

What is claimed is:

1. An image data compression transmission method for transmitting image data, with data compression, from a transmission side to a receiving side, the method comprising the steps of:
    coding line by line image data to be transmitted according to a predetermined coding process so as to produce coded data;
    adding a synchronizing code to said coded data in each predetermined number of said lines so as to produce coded information data that contains said coded data and said synchronizing code;
    transmitting said coded information data from said transmission side to said receiving side;
    receiving said transmitted coded information at said receiving side;
    extracting said synchronizing code from said coded information data received at said receiving side;
    initializing a predetermined decoding process to an initial value in synchronization with said synchronizing code extracted from said coded information data received at said receiving side;
    determining the validity of said coded information data received at said receiving side using said synchronizing code extracted therefrom; and
    when it is determined in the determining step that the received coded information data is valid, performing a synchronized line by line decoding of the coded data contained in the coded information data so as to reproduced the image data by means of the predetermined decoding process, synchronization between the coder and the decoder being achieved by means of the synchronizing code; and
    when it is determined in said determining step that said received coded information data is invalid, carrying out a predetermined error correction process for correcting an error contained in said received coded information data.

2. The image data compression transmission method as claimed in claim 1, wherein said determining step determines that said received coded information data is invalid when a detection of said synchronizing code occurs at an invalid position in said received coded information data.

3. The image data compression transmission method as claimed in claim 1, wherein said step of determining the validity of said coded information data comprises the step of:
    detecting the number of lines that are included between a pair of neighboring synchronizing codes, said neighboring synchronizing codes being extracted in said step of extracting; and
    said predetermined error correction process comprises the steps of:
    providing additional coded information data when said number of lines included between said two neighboring synchronizing codes is less than a predetermined number of lines so as to provide corrected coded information data which includes said predetermined number of lines between said neighboring synchronizing codes;
    deleting a part of said coded information data when said number of lines included between two neighboring synchronizing codes is larger than said predetermined number of lines, so as to produce corrected coded information data which includes said predetermined number of lines between said neighboring synchronizing codes;
    repeating said step of initializing; and
    decoding said corrected coded information data by conducting said predetermined decoding process, line by line, in synchronization with said synchronizing code so as to reproduce said image data.

4. The image data compression transmission method as claimed in claim 1, wherein:
    said step of determining the validity of said coded information data comprises the step of:
    detecting the number of lines included between a pair of neighboring synchronizing codes, said neighboring synchronizing codes being extracted in said step of extracting; and
    said predetermined error correction process comprises the steps of:
    skipping lines of said coded information data when said number of lines included between two neighboring synchronizing codes is less than a predetermined number of lines, so as to produce corrected coded information data which includes said predetermining number of lines between said neighboring synchronizing codes;
    deleting a part of said coded information data when said number of lines included between two neighboring synchronizing codes is larger than said predetermined number of lines, so as to produce corrected coded information data which includes said predetermined number of lines between said neighboring synchronizing codes;
    initializing to said initial value a counter used in said predetermined decoding process said counter for counting a number of lines processed by said predetermined decoding process; and
    decoding said corrected coded information data by performing said predetermined decoding process, line by line in synchronization with said synchronizing code, so as to reproduce said image data.

5. The image data compression transmission method as claimed in claim 1, wherein said step of adding the synchronizing code further comprises a step of adding information indicating the number of lines induced between a pair of neighboring synchronizing codes to said coded information data, for synchronization in said predetermined decoding process.

6. The image data compression transmission method as claimed in claim 1, wherein said step of adding to said coded information data the synchronizing code further comprises a step of:
    adding information indicating an initialization value used by said predetermined coding process and used by said predetermined decoding process.

7. The image data compression transmission method as claimed in claim 1, wherein said step of adding the synchronizing code further comprises the steps of:
    adding information, indicating the number of lines included between a pair of neighboring synchronizing codes to said coded data, for synchronization in said predetermined decoding process; and
    adding, to said coded information data information, information indicating an initialization value used by said predetermined coding process and used by said predetermined decoding process.

8. The image data compression transmission method as claimed in claim 1, wherein said step of adding the synchronizing code is conducted such that the predetermined number of lines increases toward the end of the image data.

9. The image data compression transmission method as claimed in claim 1, wherein said step of adding the synchronizing code is conducted such that the predetermined number of lines may be changed during said predetermined coding process of said predetermined decoding process.

10. A method according to claim 1, further comprising the step of:
  initializing, before the coding step, the predetermined coding process by setting an initial value of a non-priority symbol appearance probability used by the predetermined coding process.

* * * * *